(12) United States Patent
Huesges et al.

(10) Patent No.: US 9,444,303 B2
(45) Date of Patent: Sep. 13, 2016

(54) DEVICE FOR MOUNTING A SHAFT IN A HOUSING, AND ASSEMBLY HAVING A DEVICE ACCORDING TO THE INVENTION

(75) Inventors: Mario Huesges, Buehlertal (DE); Detlef Lauk, Renchen (DE); Tarek Mili, Lauterbourg (FR); Stephan Scheurich, Baden-Baden (DE)

(73) Assignee: Robert Bosch GmbH, Stuttgart (DE)

( * ) Notice: Subject to any disclaimer, the term of this patent is extended or adjusted under 35 U.S.C. 154(b) by 427 days.

(21) Appl. No.: 13/977,791

(22) PCT Filed: Nov. 23, 2011

(86) PCT No.: PCT/EP2011/070797
§ 371 (c)(1),
(2), (4) Date: Jul. 1, 2013

(87) PCT Pub. No.: WO2012/089427
PCT Pub. Date: Jul. 5, 2012

(65) Prior Publication Data
US 2013/0279838 A1 Oct. 24, 2013

(30) Foreign Application Priority Data
Dec. 29, 2010 (DE) .................. 10 2010 064 298

(51) Int. Cl.
H02K 5/16 (2006.01)
H02K 5/173 (2006.01)
H02K 7/08 (2006.01)

(52) U.S. Cl.
CPC ............ *H02K 5/173* (2013.01); *H02K 5/1732* (2013.01); *H02K 7/08* (2013.01); *H02K 7/081* (2013.01); *H02K 11/01* (2016.01)

(58) Field of Classification Search
CPC ............ H02K 5/16; H02K 5/22; H02K 7/00; H02K 7/08

USPC .............................................. 310/89, 90, 91
See application file for complete search history.

(56) References Cited

U.S. PATENT DOCUMENTS

| | | | | |
|---|---|---|---|---|
| 5,831,360 A | * | 11/1998 | Senjo ..................... | H02K 1/185 310/80 |
| 6,215,209 B1 | * | 4/2001 | Yamamoto ............... | F16H 1/16 29/596 |
| 6,242,830 B1 | * | 6/2001 | Katagiri ................. | H02K 1/187 29/598 |

FOREIGN PATENT DOCUMENTS

| | | |
|---|---|---|
| CN | 101401280 | 4/2009 |
| DE | 3906842 | 9/1989 |
| DE | 102008000887 | 10/2009 |
| DE | 102009019726 | 11/2010 |
| DE | 102009027501 | 1/2011 |

OTHER PUBLICATIONS

International Search Report for Application No. PCT/EP2011/070797 dated Sep. 27, 2012 (2 pages).

* cited by examiner

*Primary Examiner* — Tran Nguyen
(74) *Attorney, Agent, or Firm* — Michael Best & Friedrich LLP

(57) ABSTRACT

The invention relates to a device (10) for mounting a shaft (1; 26) in a housing (100), having a bearing (5; 5b; 5c) which is connected to the shaft (1; 26) and which is arranged at least indirectly in the housing (100) by means of a positive or non-positive fit, wherein the bearing (5; 5b; 5c) is held in a separate holding body (11; 11a to 11c). It is provided according to the invention that the holding body (11; 11 a to 11c) is held so as to be fixed to the housing (100) in at least one direction by means of a positive and/or non-positive fit, and that the holding body (11; 11a to 11c) is connected directly to components of an electric motor (25).

12 Claims, 3 Drawing Sheets

DEVICE FOR MOUNTING A SHAFT IN A HOUSING, AND ASSEMBLY HAVING A DEVICE ACCORDING TO THE INVENTION

BACKGROUND OF THE INVENTION

The invention relates to a device for mounting a shaft in a housing. Furthermore, the invention relates to an assembly, in particular an electric motor or a transmission/drive unit, having a mounting device.

A device of this type for mounting a shaft in a housing is known from DE 10 2009 027501 A1 which is a later publication by the applicant. In said device, it is provided that a bearing which serves to mount an armature shaft is received in a separate receiving body which is in turn arranged in a housing, for example in a housing of a transmission/drive unit. By means of an arrangement of this type, it is possible to check the function of an electric motor in a state in which it has not yet been installed. More detailed information with regard to the arrangement of the receiving body in the housing cannot be gathered, however, from the stated document.

Bearings are usually fixed in the housing, by being introduced on one side directly into a housing part. The bearings are held counter to the mounting direction by a positively locking or non-positive connection. The positively locking connection is produced as a rule via standard parts, disk springs, securing rings or circlips, or else by means of shaped parts which are connected fixedly to the housing part. The introduction of force from the bearing takes place as a rule directly via the housing or via the element which produces the positively locking connection. As an alternative, it is known to ensure an axial support of a shaft, for example an armature shaft, at both shaft ends, by corresponding stops receiving the armature shaft. In order to compensate for the axial tolerances, a setting process is required, for examples via screws or via elastic elements, such as springs. The above-described possibilities for mounting a shaft in a housing are of relatively complicated design, since they require additional parts and/or require relatively high outlay with regard to accurate production of the individual parts.

SUMMARY OF THE INVENTION

Proceeding from the prior art which is shown, the invention is based on the object of developing a device for mounting a shaft in a housing, in such a way that relatively simple and inexpensive mounting of the shaft in the housing is made possible. Here, the invention is based on the concept of receiving the receiving body, configured as a separate component, for the bearing in a fixed manner by a positively locking or non-positive connection in at least one direction in the housing, the receiving body for its part being connected directly to components of an electric motor. No further fastening elements or parts are therefore required as a rule.

In one structural implementation of the invention which can be produced in a particularly inexpensive manner, it is provided that the receiving body is configured as a deep-drawn part. A configuration of this type makes it possible to design the receiving body as a mass-produced component.

It is very particularly provided here that the receiving body is configured from sheet metal and fixes the bearing by a positively locking or non-positive connection in the receiving body. Only the receiving of the receiving body made from sheet metal makes the discussed fastening options possible, which fastening options can be realized with relatively low complexity.

It is provided here, in particular, that the bearing is fixed in the receiving body by being flanged over or by brackets.

In order to arrange or fix the receiving body in the housing, it can be provided in one advantageous refinement of the invention that the receiving body has a flange which interacts with the housing in a positively locking or non-positive manner. It can just as well be provided here that the receiving body is connected to the electric motor by means of fastening elements. This makes particularly secure receiving or fastening of the receiving body in the housing possible.

A further advantageous refinement of the invention provides that the receiving body is arranged in a housing of an electric motor and forms an electromagnetic shield of the electric motor. In this case, in addition to its function of receiving the bearing, the receiving body has an additional function which would otherwise possibly have to be fulfilled by additional, separate components, such as shielding plates or the like.

Moreover, an arrangement of the receiving body which is particularly simple and insensitive to tolerances is made possible if the receiving body is fastened in a pole tube of the electric motor by means of a further element, the receiving body being fixed axially between the further element and the pole tube.

The invention also comprises an assembly, in particular an electric motor for a transmission/drive unit having a device according to the invention and a housing, in which the receiving body is received. An assembly of this type can be made possible in a particularly inexpensive manner by the use of parts which can be produced inexpensively and the option to produce the parts with relatively large tolerances.

BRIEF DESCRIPTION OF THE DRAWINGS

Further advantages, features and details of the invention result from the following description of preferred exemplary embodiments and using the drawing, in which.

DETAILED DESCRIPTION

Identical components or components with the same function are provided with the same designations in the figures.

The figures show a device 10 according to the invention for mounting a shaft 1 in a housing. The mounting of the shaft 1 is used, preferably but not such that it is restricted thereto, in transmission/drive units or electric motors, as are used in the automotive industry, for example as part of a window lifter drive or a windshield wiper drive.

Figure 1:
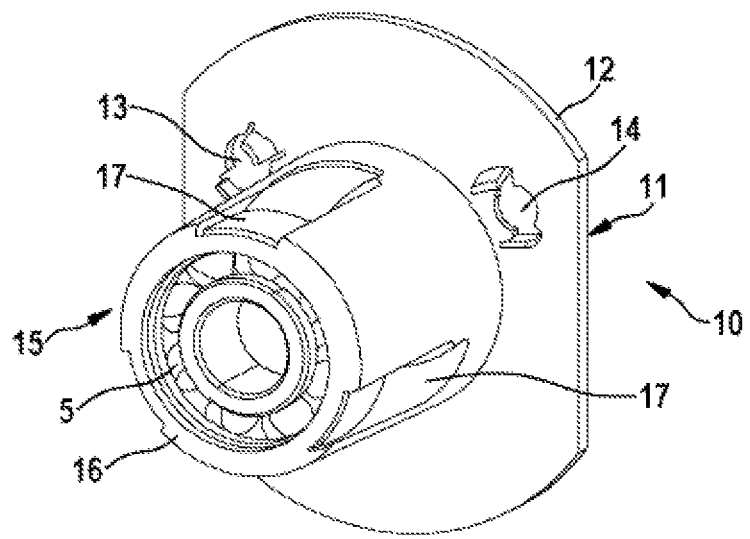
FIG. 1 shows a perspective view of a receiving body for mounting a shaft having a bearing which is arranged in the receiving body.

FIG. 1 shows a first exemplary embodiment of the invention, in which the device 10 comprises a receiving body 11 for receiving a bearing 5. In the exemplary embodiment which is shown in FIG. 1, the bearing 5 is configured as a ball bearing. It goes without saying that it lies within the scope of the invention to also use other bearings 5, for example plain bearings. The receiving body 11 is configured as a deep-drawn part and is preferably composed of sheet metal. It has a circumferential flange region 12, in which, by way of example, two through openings 13, 14 are formed, via which the receiving body 11 can be fastened to components of an electric motor (not shown in FIG. 1), in particular by way of screws, pins or the like. Furthermore, the receiving body is received in the housing in a manner which is fixed axially in one direction, at least indirectly. Furthermore, through openings 13, 14 can also be formed for leadthroughs of electric lines in the flange region 12 of the receiving body 11.

Starting from the flange region 12, the receiving body 11 has a cylindrical or tubular receiving region 15, in which the bearing 5 is received in a positively locking and non-positive manner. To this end, a flanged-over bottom section 16 of the receiving region 15 forms an axial stop for the bearing 5. The bearing 5 is received radially with at most a minimum gap in the receiving region 15 or is enclosed by the latter. Furthermore, a plurality of, for example three, brackets 17 can be seen which are distributed at regular angular intervals over the circumference of the receiving region 15, are arranged in the axial direction of the receiving region 15 and are formed by the receiving region 15 being punched out. After it has been introduced into the receiving region 15, the bearing 5 is secured axially in the receiving region 15 by the brackets 17 being bent over or pressed into the receiving region 15.

Figure 2:
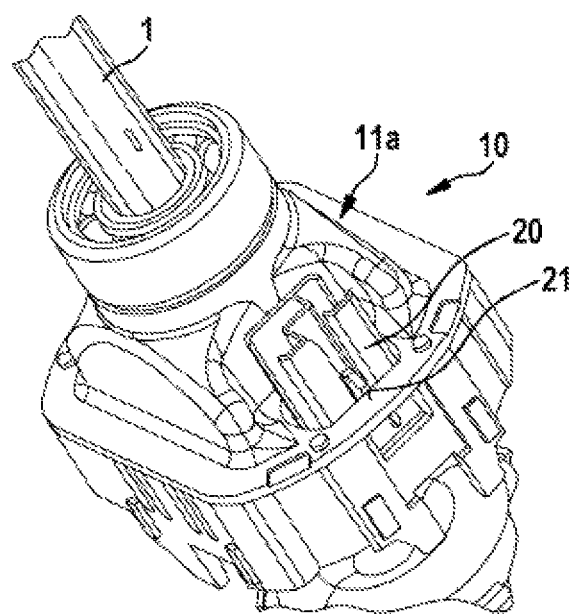
FIG. 2 shows a receiving body which is modified with respect to FIG. 1 and is connected to a brush carrier unit.

FIG. 2 shows a further exemplary embodiment of the invention. Here, the deep-drawn receiving body 11a forms a structural unit which can be preassembled together with a further component, for example a component of an electric motor (not shown in further detail), for example of a brush carrier 20. Here, the brush carrier 20 of the electric motor is connected fixedly to the receiving body 11a, for example by a non-positive connection by way of receiving pins or the like. Furthermore, it can be seen in FIG. 2 that the receiving body 11a has an aperture 21, through which a section of the brush carrier 20 protrudes.

Figure 3:
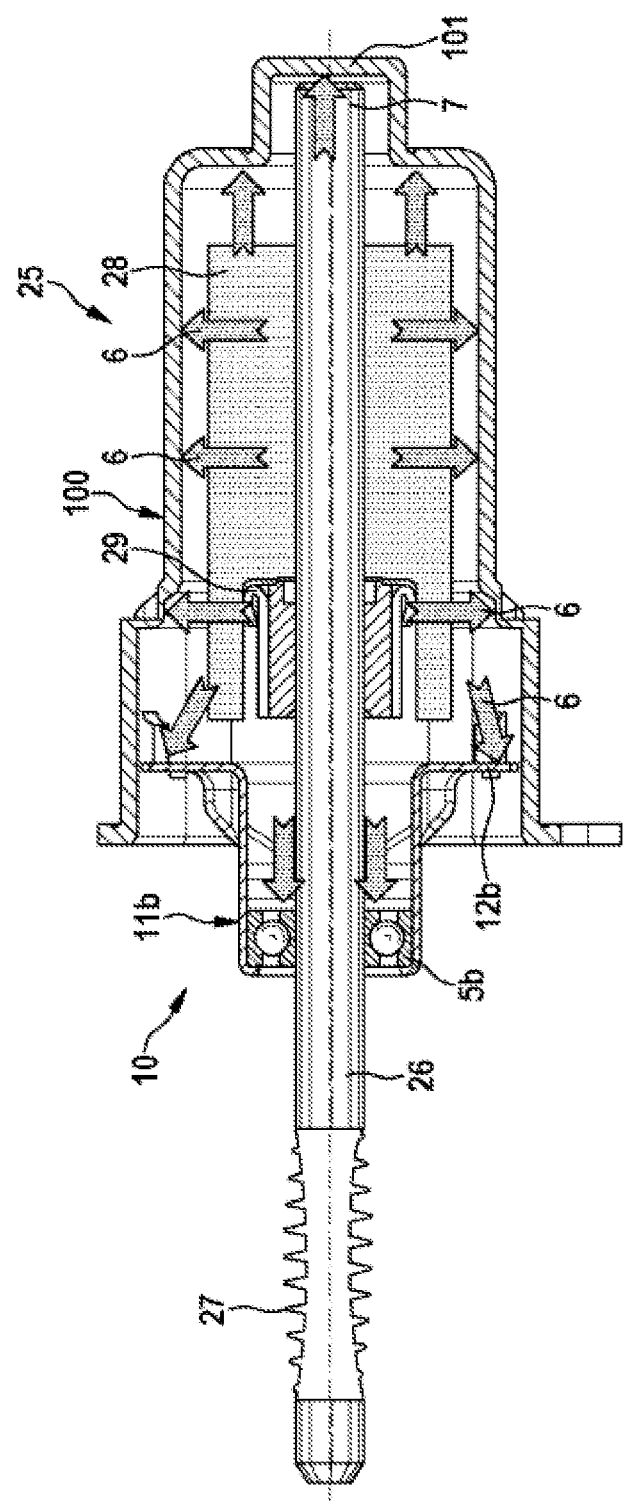
FIG. 3 shows a longitudinal section through an electric motor using a receiving body according to the invention.

FIG. 3 shows a further embodiment of the invention. Here, the device 10 is a constituent part of an electric motor 25. An armature shaft 26 of the electric motor 25 protrudes out of the housing 100 of the electric motor 25 and has a toothing system 27 at its shaft end. Furthermore, an armature 28, which is arranged fixedly on the armature shaft 26 so as to rotate with it, and a commutator 29 can be seen inside the housing 100. The commutator 29 and the armature 28 emit electromagnetic beams, which is to be indicated by the arrows 6. The deep-drawn receiving body 11b is arranged with its flange region 12b inside the housing 100, said deep-drawn receiving body 11b being connected to components of the electric motor 25, preferably via connecting elements (not shown). In particular, if the receiving body 11b is composed of metal or sheet metal, the receiving body 11b therefore acts as a shielding element which reduces or decreases an emission of electromagnetic radiation out of the housing 100. Furthermore, it can be seen that the bearing 5b is fixed axially merely in one direction within the receiving body 11b. The support or axial securing of the armature shaft 26 in the housing 100 takes place via one end 7 of the armature shaft 26, which end 7 is arranged in an operative connection with the housing bottom 101. As an alternative, the bearing 5b is configured as a locating bearing which absorbs the forces which act axially on the armature shaft and discharges them to the housing 100. Here, the bearing 5b is preferably configured as a ball bearing, the inner ring of which is fastened in an axially fixed and firm manner on the armature shaft so as to rotate with it. The outer ring of the ball bearing is fixed firmly in the housing 100, with the result that axial support via the end sides of the armature shaft is not necessary.

Figure 4:
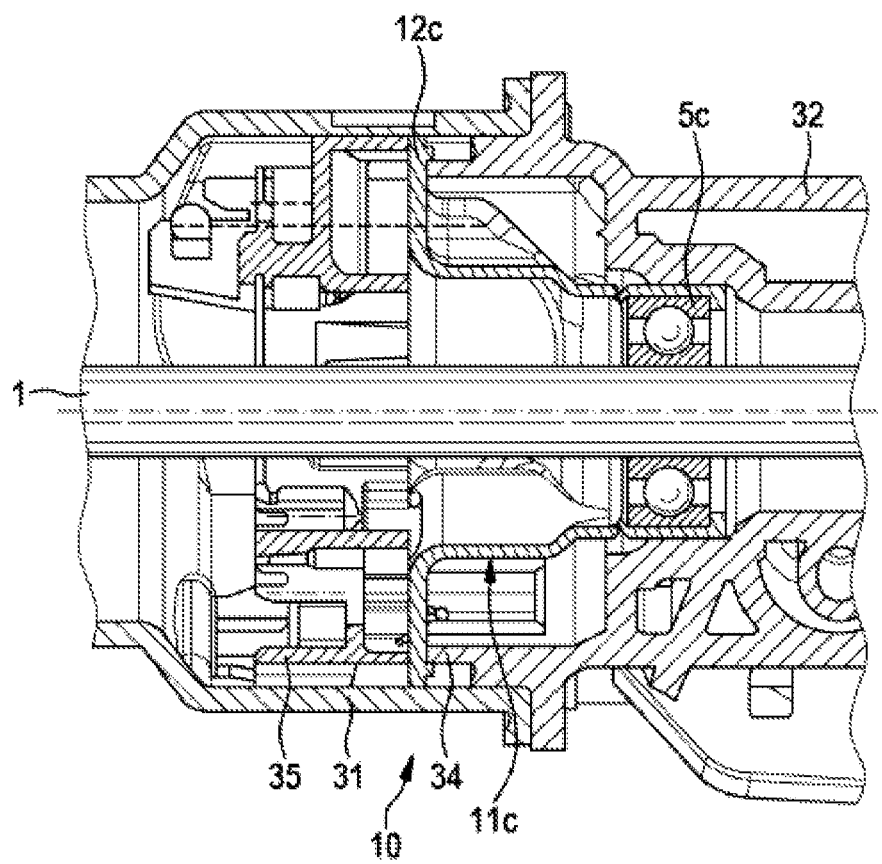
FIG. 4 shows the arrangement of a receiving body according to the invention between various components of an assembly in longitudinal section.

FIG. 4 shows a further refinement of the invention. Here, the deep-drawn receiving body 11c is received or fixed within a pole tube 31 with its flange region 12c. That region of the receiving body 11c which carries the bearing 5c protrudes out of the pole tube 31. The receiving body 11c is clamped axially between the pole tube 31 and a transmission housing 32 which is part of a transmission/drive assembly. Here, an end-side face 34 of the transmission housing 32 presses against the flange region 12c of the receiving body 11c which in turn, on the side which lies opposite the face 34, bears in a bearing contact against a component 35 which is arranged within the pole tube 31.

The device 10 which has been described thus far or its constituent parts can be changed or modified in a wide variety of ways, without deviating from the concept of the invention. Said concept consists in an arrangement of a bearing 5, 5b, 5c, serving to mount the shaft 1, in a separate receiving body 11, 11a, 11b, 11c which in turn is received or fastened in a positively locking or non-positive manner in a housing 100, the receiving body 11, 11a, 11b, 11c being connected to components of the electric motor.

What is claimed is:

1. A device for mounting a shaft in a housing of an electric motor, the device comprising:
   a bearing which is connected to the shaft and is arranged at least indirectly in the housing, the bearing being received in a separate receiving body;
   wherein the receiving body is received in a fixed manner in the housing; and
   wherein the receiving body has a cylindrical or tubular receiving region for the bearing, and the receiving body is fastened in a pole tube of the electric motor by a further element, the receiving body being fixed axially between the further element and the pole tube.

2. The device as claimed in claim 1, wherein the receiving body is configured as a deep-drawn part.

3. The device as claimed in claim 2, wherein the receiving body is configured from sheet metal and fixes the bearing by a positively locking or non-positive connection in the receiving body.

4. The device as claimed in claim 3, wherein the bearing is fixed in the receiving body by being flanged over or by brackets.

5. The device as claimed in claim 3, wherein the receiving body has a flange which interacts with the housing in a positively locking or non-positive manner.

6. The device as claimed in claim 3, wherein the receiving body forms an electromagnetic shield of the electric motor.

7. An electric motor or transmission/drive unit comprising:
   a housing including a pole tube;
   a shaft arranged axially in the housing; and
   a device for mounting the shaft in the housing, the device including a bearing supporting the shaft, and a receiving body received in a fixed manner in the pole tube, the receiving body having a cylindrical or tubular receiving region receiving the bearing, and the receiving body being fastened in the pole tube by a further element and fixed axially between the further element and the pole tube.

8. The electric motor or transmission/drive unit as claimed in claim 7, wherein the shaft has a toothing system.

9. The electric motor or transmission/drive unit as claimed in claim 7, wherein the receiving body has a flange, and wherein the flange is clamped axially between the further element and a component arranged within the pole tube.

10. The electric motor or transmission/drive unit as claimed in claim 9, wherein the further element is a transmission housing, and wherein the flange is clamped axially between the component and an end-side face of the transmission housing.

11. The device as claimed in claim 1, wherein the receiving body has a flange, and wherein the flange is clamped axially between the further element and a component arranged within the pole tube.

12. The device claimed in claim 11, wherein the further element is a transmission housing, and wherein the flange is clamped axially between the component and an end-side face of the transmission housing.

* * * * *